United States Patent
Lai

(10) Patent No.: US 11,520,493 B2
(45) Date of Patent: Dec. 6, 2022

(54) ALLOCATION POLICY FOR SHARED RESOURCE ACCESSIBLE IN BOTH SECURE AND LESS SECURE DOMAINS

(71) Applicant: Arm Technology (China) Co. LTD, Shenzhen (CN)

(72) Inventor: Chi-Chang Lai, Hsinchu (TW)

(73) Assignee: ARM TECHNOLOGY (CHINA) CO. LTD, Shenzhen (CN)

( * ) Notice: Subject to any disclaimer, the term of this patent is extended or adjusted under 35 U.S.C. 154(b) by 712 days.

(21) Appl. No.: 16/519,085

(22) Filed: Jul. 23, 2019

(65) Prior Publication Data
US 2021/0026540 A1    Jan. 28, 2021

(51) Int. Cl.
*G06F 21/74* (2013.01)
*G06F 3/06* (2006.01)
*G06F 12/12* (2016.01)

(52) U.S. Cl.
CPC .......... *G06F 3/0622* (2013.01); *G06F 3/0631* (2013.01); *G06F 3/0683* (2013.01); *G06F 12/12* (2013.01); *G06F 21/74* (2013.01)

(58) Field of Classification Search
CPC ...... G06F 3/0633; G06F 3/0631; G06F 21/74; G06F 12/084
See application file for complete search history.

(56) References Cited

U.S. PATENT DOCUMENTS

| | | | |
|---|---|---|---|
| 2010/0174919 A1* | 7/2010 | Ito | G06F 21/74 713/192 |
| 2013/0212700 A1* | 8/2013 | Grocutt | G06F 21/606 726/27 |
| 2017/0149931 A1 | 5/2017 | Lochhead et al. | |
| 2018/0203807 A1* | 7/2018 | Krueger | G06F 12/0875 |
| 2019/0042388 A1 | 2/2019 | Wang et al. | |

FOREIGN PATENT DOCUMENTS

| | | |
|---|---|---|
| CN | 104915151 A | 9/2015 |
| CN | 109522754 A | 3/2019 |
| WO | WO-2012/024057 A2 | 2/2012 |

OTHER PUBLICATIONS

International Search Report and Written Opinion issued in International Application No. PCT/IB2020/056808 dated Nov. 3, 2020 (6 pages).

* cited by examiner

*Primary Examiner* — Ellen Tran
(74) *Attorney, Agent, or Firm* — Foley & Lardner LLP

(57) ABSTRACT

Processing circuitry may support a secure domain and a less secure domain, where secure information associated with a secure software process is prevented from being accessed by a less secure software process in the less secure domain. Shared resource is accessible to both secure and less secure software processes. In response to detection of an anomaly condition, allocation policy for the shared resource is switched from a shared allocation policy to a secure-biased allocation policy. The secure-biased allocation policy has a stronger bias of resource allocation to secure software processes than the shared allocation policy.

20 Claims, 4 Drawing Sheets

ALLOCATION POLICY FOR SHARED RESOURCE ACCESSIBLE IN BOTH SECURE AND LESS SECURE DOMAINS

BACKGROUND

Technical Field

The present technique relates to the field of data processing.

Technical Background

Processing circuitry may be provided with a number of domains of operation including at least a secure domain and a less secure domain. Program code or data associated with the secure domain can be prevented from being accessible to a less secure software process processed in the less secure domain. Hence this approach allows processing devices to support secure applications which are isolated from access by other applications.

SUMMARY

Viewed from one aspect, the present technique provides an apparatus comprising: processing circuitry having a plurality of domains of operation including a secure domain and a less secure domain;

access control circuitry to prevent secure information associated with a secure software process processed in the secure domain from being accessed by a less secure software process processed in the less secure domain;

shared resource accessible to both secure software processes processed in the secure domain and less secure software processes processed in the less secure domain; and resource allocation control circuitry to control allocation of the shared resource according to an allocation policy; in which:

in response to detection of an anomaly condition, the resource allocation control circuitry is configured to switch the allocation policy from a shared allocation policy to a secure-biased allocation policy; and compared to the shared allocation policy, the secure-biased allocation policy has a stronger bias of resource allocation to secure software processes in preference to resource allocation to less secure software processes.

Viewed from one aspect, the present technique provides an apparatus comprising:

means for processing, having a plurality of domains of operation including a secure domain and a less secure domain;

means for preventing secure information associated with a secure software process processed in the secure domain from being accessed by a less secure software process processed in the less secure domain;

means for providing shared resource, accessible to both secure software processes processed in the secure domain and less secure software processes processed in the less secure domain; and means for controlling allocation of the shared resource according to an allocation policy; in which:

in response to detection of an anomaly condition, the means for controlling is configured to switch the allocation policy from a shared allocation policy to a secure-biased allocation policy; and compared to the shared allocation policy, the secure-biased allocation policy has a stronger bias of resource allocation to secure software processes in preference to resource allocation to less secure software processes.

Viewed from one aspect, the present technique provides a data processing method for an apparatus comprising processing circuitry having a plurality of domains of operation including a secure domain and a less secure domain, where secure information associated with a secure software process processed in the secure domain is prevented from being accessed by a less secure software process processed in the less secure domain; the method comprising:

performing processing using shared resource, where the shared resource is accessible to both secure software processes processed in the secure domain and less secure software processes processed in the less secure domain; and controlling allocation of the shared resource according to an allocation policy; in which:

in response to detection of an anomaly condition, the allocation policy is switched from a shared allocation policy to a secure-biased allocation policy; and compared to the shared allocation policy, the secure-biased allocation policy has a stronger bias of resource allocation to secure software processes in preference to resource allocation to less secure software processes.

Further aspects, features and advantages of the present technique will be apparent from the following description of examples, which is to be read in conjunction with the accompanying drawings.

DESCRIPTION OF EXAMPLES

Figure 1:
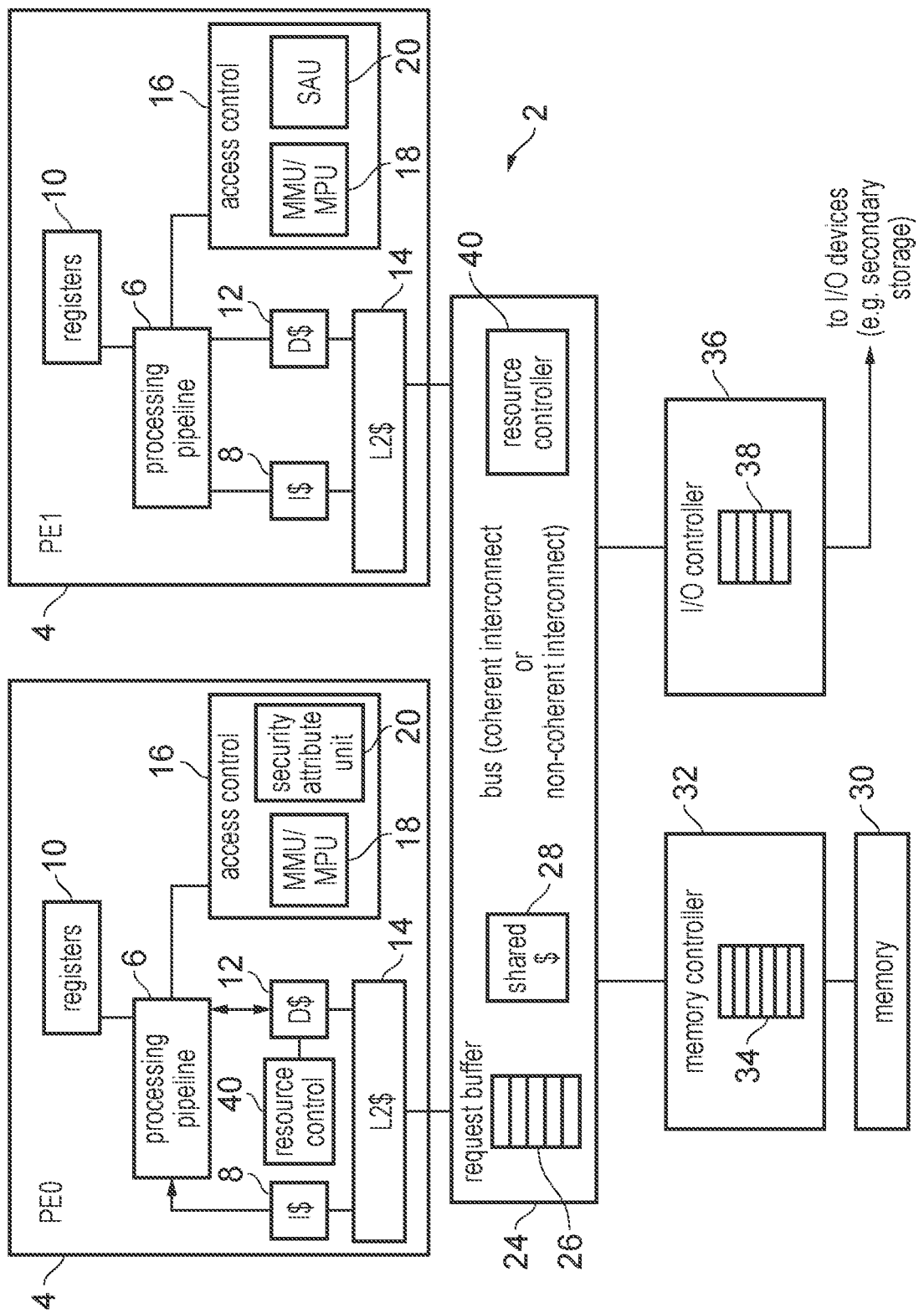
FIG. 1 illustrates an example of a data processing apparatus.

An apparatus has processing circuitry having two or more domains of operation including at least a secure domain and a less secure domain. Access control circuitry is provided to prevent secure information associated with a secure software process processed in the secure domain from being accessed by a less secure software process processed in the less secure domain. The secure information could be program code or data for example. At least one form of shared resource is provided, which is accessible to both secure software processes processed in the secure domain and less secure software processes processed in less secure domain. For example, the shared resource could be storage capacity provided within a cache, bandwidth on a bus, or storage space in a buffer. Resource allocation control circuitry may control allocation of the shared resource according to a particular allocation policy. For example, the allocation policy may control which parts of the shared resource are allocated to particular software processes, and whether or not a request from a given software process can be serviced using available resource.

While the access control circuitry may prevent secure information associated with a secure software process being accessible by a less secure software process, the inventor recognised that leakage of the secure information is not the only form of potential attack which a malicious user running a less secure software process may attempt to mount on a secure software process being executed on the same system. Another form of possible attack may be a denial of service (DoS) attack, in which the less secure software process may generate such demand for access to the shared resource that the secure software process may be starved of sufficient resource to be able to function properly.

One potential approach for dealing with this problem could be to provide dedicated resource accessible only to the secure domain, which cannot be accessed by less secure software processes processed in the less secure domain. For example a dedicated secure cache could be provided. However, this approach may be inefficient in terms of circuit area and hardware costs, since often the secure software process may not fully need the dedicated resource provided.

Another approach can be that the resource is still shared, however different allocation policies are used to control access to the shared resource depending on whether a request for resource has been made from the secure software process or the less secure software process. For example, secure software processes may have more favourable allocation rules than less secure software processes. However, permanently using such an allocation policy can reduce overall system performance since even if the secure domain does not need much resource, and/or there is little risk of a DoS attack, the less secure domain has its resource usage (and hence performance) constrained because the resource allocation favours the secure process.

In the techniques discussed below, the allocation policy used to control allocation of the shared resource can be varied by the resource allocation control circuitry, based on detection of an anomaly condition. In response to detection of the anomaly condition, the resource allocation control circuitry may switch the allocation policy from a shared allocation policy to a secure-biased allocation policy. In comparison to the shared allocation policy, the secure-biased allocation policy has a stronger bias towards resource allocation to secure software processes in preference to resource allocation to less secure software processes. Hence, at times when an anomaly condition is detected which indicates a potential risk of attack, the allocation policy can be switched to the secure-biased allocation policy which preferentially allocates resource more favourably to secure software processes than to less secure software processes, which can help to reduce the likelihood that a denial of service attack can be successful. However, in scenarios where the anomaly condition has not been detected then the shared allocation policy can continue to be used, so that the performance cost of permanently using the secure-biased allocation policy is not incurred and it is possible when using the shared allocation policy for the less secure software processes to use a larger share of resource when no anomaly condition has been detected. Hence, by dynamically varying the allocation policy used based on the detection of the anomaly condition this provides a better balance between security and performance.

The anomaly condition detected for triggering the switch of allocation policy may be any condition which indicates there is a risk of a potential attack. For example the anomaly condition could be based on a sign of abnormal behaviour caused by processes in the less secure domain. For example the anomaly condition may be a condition indicative of starvation of shared resource for the secure software processes due to demand for shared resource by the less secure software processes.

There may be a number of ways of detecting the anomaly condition. In general, a performance metric indicative of the level of demand for shared resource by the less secure software processes may be tracked.

In one example the shared resource may comprise a cache and the performance metric may be a cache replacement rate, which is indicative of a frequency with which information stored in the cache is evicted to make way for other information. In some cases the cache replacement rate could be tracked in general for all cache replacements (regardless of whether the cache replacements were caused by requests from the secure software process or a less secure software process). In other examples the cache replacement rate could be tracked specifically for cache replacements caused by requests from the less secure domain. Hence, in this example, the anomaly condition may depend on whether the cache replacement rate exceeds a given threshold. If the cache replacement rate exceeds the threshold then this may indicate abnormal behaviour that could be a sign of an attack by a malicious user, and in this case the shared allocation policy may be switched to the secure-biased allocation policy which has a stronger bias of allocation to secure software processes, to reduce the chance that a denial of service attack can successfully starve the secure software processes of resource.

In another example, the anomaly condition could depend on a latency metric which indicates latency of servicing requests for access to the shared resource. This approach could be used not only where the shared resource comprises a cache, but also for other types of resource such as a bus or space in a buffer. In this case, the anomaly condition may depend on the latency metric exceeding a threshold. Hence, if a measure of request servicing latency indicates that requests are generally slow to be serviced then this may indicate that there may have been excessive demand for the resource, and so in this case the allocation policy may be changed to the secure-biased allocation policy to reduce the chance of denial of service attacks on secure processes.

In some implementations, the anomaly-triggered switching of allocation policy discussed above may be permanently enabled, so that at all times there is a detection of whether the anomaly condition has been detected and if the anomaly condition is detected then the allocation policy is switched to the secure-biased allocation policy.

However, in other implementations it may be possible to enable or disable whether the anomaly-triggered switching of allocation policy is performed. In this case when anomaly-triggered switching of allocation policy is enabled, then the resource allocation control circuitry switches the allocation policy to the secure-biased allocation policy in response to detection of the anomaly condition, as discussed above. However when anomaly-triggered switching of allocation policy is disabled, the resource allocation control circuitry may use the shared allocation policy regardless of whether the anomaly condition occurs. By providing the option to disable the anomaly-triggered switching of allocation policy, this means that in scenarios where there is less risk of denial of service attacks or if the consequences of such an attack were less significant, then the shared allocation policy may continue to be used regardless of whether any anomaly condition is detected, which will tend to improve performance for the less secure software processes. However, in scenarios where the risk of denial of service attack is of concern then the anomaly-triggered switching of allocation policy may be enabled.

Note that when anomaly-triggered switching of allocation policy is disabled, it is possible that tracking of the performance metric or other indication used to determine whether the anomaly condition has occurred may still continue. For example, in some cases even when the anomaly-triggered switching of allocation policy is disabled, it may be desirable to continue tracking the performance metrics used to detect the anomaly condition for other purposes. For example, shared performance counters which are also used for analysing general performance of software code could be reused for detection of the anomaly condition, so it may be desired that such performance metrics still count events of interest regardless of whether the anomaly-triggered switching of allocation policy is disabled. Also, even if dedicated performance counters are used for the anomaly condition that are not needed for other purposes, it may still be desirable to continue tracking the performance metrics while anomaly-triggered switching of allocation policy is disabled, so that when the switching is subsequently enabled again then the performance metrics are up to date to allow a more accurate impression of the current level of demand for shared resource from the less secure software processes.

Alternatively, in other embodiments when anomaly-triggered switching of allocation policy is disabled then the tracking of any related performance metrics for evaluating whether the anomaly condition occurred could also be disabled.

In some examples the enabling and disabling of whether anomaly-triggered switching of allocation policy is performed may be controlled based on a configuration parameter in a control register. For example a control register may be provided which enables or disables this functionality as the whole, for example set by a secure process in the secure domain.

However, in other examples the enabling or disabling of the anomaly-triggered switching of allocation policy could also depend on a current domain and/or operating mode of the processing circuitry. For example there may be certain domains or operating modes which are more at risk of attack and the potential performance cost of using the secure-biased allocation policy may not be considered justified for other domains and/or operating modes which are less at risk of an attack (or for which the consequences of an attack are less significant).

Hence, in some examples the resource allocation control circuitry may enable the anomaly-triggered switching of allocation policy in response to a predetermined transition of domain and/or operating mode of the processing circuitry. For example, the predetermined transition could be a transition from the secure domain to the less secure domain. By triggering the switch of allocation policy to the secure-biased allocation policy when a transition from the secure domain to the less secure domain occurs, this makes it less likely that the subsequent processing in the less secure domain following this transition can monopolise use of a significant fraction of the available resource, so that when the processing circuitry subsequently transitions again back to the secure domain it is more likely that there will be some resource available to (or remaining occupied by) the secure domain making it less likely that a denial of service attack can successfully prevent the secure software processing the secure domain function properly. For example, switching to a secure-biased allocation policy on switching to the less secure domain could help to preserve secure information allocated to a cache by a secure process.

In another example, where within a given domain the processing circuitry may perform data processing in one of two or more different operating modes, the predetermined domain transition may be a transition from a first mode/ domain combination to a second mode/domain combination. For example there may be a particular combination of domain and mode which is considered most at risk from attack, and so when transitioning from that particular mode/ domain combination to a different mode/domain combination it may be desirable to enable the anomaly-triggered switching of allocation policy so that it is less likely that resource allocated to the first mode/domain combination will be reallocated to processes operating in the second mode/ domain combination.

For example, the operating modes may include a handler mode for exception processing and a thread mode for background processing. In some cases the first mode/domain combination may comprise processing in the secure domain and the handler mode and the second mode/domain combination may comprise processing in the less secure domain and either one of the handler mode and the thread mode. This recognises that in some cases, it may be the combination of the secure domain and the handler mode which is the combination of states that is most attractive for a malicious party to attack, and for which it is most critical that the software processes executing in the secure domain and the handler mode combination are able to use a reasonable share or shared resource. This is because the handler mode is for exception processing and so the secure software processes executing in the combination of the secure domain and the handler mode may be the secure processes for which processing performance is most critical as this may affect interrupt handling latency which could be critical for safety or other reasons. There may be less concern about denial of service attacks succeeding against software processes executed in the combination of the secure domain and the thread mode as often the thread mode is less latency-critical than the handler mode. Therefore, by enabling the anomaly-triggered switching of allocation policy when transitioning from the secure/handler combination to a combination of the less secure domain and either handler or thread mode, this can ensure better security and interrupt handling latency by reducing the scope for denial of service attacks on secure interrupt handlers, but the share allocation policy can continue to be used in other cases to improve performance.

In the examples discussed above, the enabling of the anomaly-triggered switching of allocation policy may take place when there is a switch from the mode considered at risk to the denial of service attacks to a different mode. However another approach would be that the anomaly-triggered switching of allocation policy is enabled when there is a switch into the mode considered at risk of denial of service attacks, so that regardless of which other mode/ domain combination is transitioned to afterwards then the anomaly-triggered switching of allocation policy will already have been enabled. Hence, while a number of examples have been given above, the precise transition of operating mode and/or domain which results in the enabling of the anomaly-triggered switching of allocation policy may vary from implementation to implementation.

Conversely, in response to another transition of the domain and/or operating mode of the processing circuitry the resource allocation control circuitry may disable the anomaly-triggered switching of allocation policy. Alternatively, after elapse of a predetermined period since the predetermined transition which caused anomaly-triggered switching to be enabled, the anomaly-triggered switching could be disabled again. Hence, when there is no longer perceived to be a risk of secure processes being attacked then the anomaly-triggered switching of allocation policy can be disabled, which will tend to improve performance for less secure software processes because the shared allocation policy no longer needs to prioritise the secure software processes for resource allocation.

In another example, rather than enabling or disabling the anomaly-triggered switching of allocation policy, a similar functionality could be controlled by varying the threshold at which the anomaly condition is detected depending on a current domain or current operating mode of the processing circuitry and/or on a history of previous domain and/or operating mode transitions. For example, after a transition to a domain/mode which indicates that secure software processes could potentially be at risk of attack, the threshold for anomaly condition could be lowered compared to if that transition had not occurred, so that this effectively increases the likelihood that the allocation policy will be switched. Conversely, if the domain/mode transitions are such that an attack is not considered to pose a significant risk then the threshold could be raised so that is it less likely that the anomaly condition will be detected. Again, this may provide another means of adjusting the likelihood of switching of allocation policies based on the perceived risk in certain domains or modes of operation, to better balance performance against security.

Regardless of whether the anomaly-triggered switching of allocation policy is permanently enabled or can be selectively enabled or disabled, once it is detected that the anomaly condition no longer arises (having previously switched the allocation policy to the secure-biased allocation policy), the resource allocation control circuitry may then switch the allocation policy back to the shared allocation policy. This enables performance to be improved once the risk of attack has passed.

In some examples, in the shared allocation policy, control of allocation of resource may be independent of whether resources are requested by a secure software process or a less secure software process. Hence, in this case, for the shared allocation policy, secure and less secure software processes may be treated equally in terms of their likelihood of gaining access to shared resource when requested.

Alternatively, even in the shared allocation policy there could still be a bias of resource allocation to secure software processes in preference to resource allocation to less secure software processes. However, in this case the secure-biased allocation policy may have a stronger bias towards the secure software processes than the shared allocation policy.

There may be a number in ways in which the secure-biased allocation policy can bias its allocation towards the secure software processes in preference to the less secure software processes.

In one example, in the secure-biased allocation policy, a portion of the shared resource may be reserved exclusively for secure software processes and cannot be used by less secure software processes. Alternatively, rather than reserving a specific portion of the shared resource, while any particular instance of shared resource could be allocated to either a secure software process or a less secure software process, the secure-biased allocation policy may restrict a maximum fraction of this shared resource that is allowed to be allocated to less secure software processes. For example, a count of how much resource has previously been allocated to less secure software processes may be maintained, and when the count exceeds a certain threshold then no further allocation to less secure software processes may be allowed and this may reserve remaining resource for use by secure software processes only. Either way, whether or not the reserved portion of the shared resource is a certain fixed portion of resource or is a virtually reserved portion reserved by controlling the maximum fraction allowed for less secure software processes, such a secure-biased allocation policy can ensure that the secure software processes are always allowed to be granted a certain minimum amount of resource.

In another example, in the secure-biased allocation policy, the resource allocation control circuitry may prevent resource being reallocated from a secure software process to a less secure software process, whereas reallocation of resource from a less secure software process to a secure software process may still be allowed. This again can ensure that it is not possible for excessive demand by less secure software processes to prevent resource being allocated to secure software processes. For example, where the shared resource is a cache, a secure cache entry could be prevented from being replaced with a less secure entry. Also in the example of shared resource on a bus, where a bus credit scheme is used to control when a given process gain access to the bus, then a scheme may be used where when a secure process relinquishes a bus credit then only a request from a secure process can take up that credit and gain access to some bandwidth on the bus, whereas when a less secure process relinquishes a bus credit then that credit could be taken by either a less secure process or a secure process.

In the example discussed in the previous paragraph, less secure processes may still be allowed to be allocated resource when the secure-biased allocation policy is used, however they cannot take resource previously allocated to a secure software process, so that the secure software processes are at least guaranteed as much shared resource that they had at the point when switching to the secure-biased allocation policy, and may still potentially gain resource reallocated from a less secure software process.

In another example, in the secure-biased allocation policy, allocation of resource to less secure software processes may be prevented altogether, so that it is guaranteed that any resource becoming available is allocated to the secure processes. For example, in the context of a cache, allocations into the cache in response to a request issued by a less secure software process which is processed in the less secure domain may be rejected when the secure-biased allocation policy is used, but may be allowed when the shared allocation policy is used. For example, memory accesses issued from the less secure domain when the secure-biased allocation policy is used may be treated as non-cacheable. This may be acceptable in the case where the shared resource comprises a cache because even if requests from the less secure domain cannot be cached, they may still be serviced based on memory and while this may be slower it may still allow forward progress to be made in the less secure software processes. Once the danger of an attack has passed and the anomaly condition is no longer detected, then it may be desirable to switch back to the shared allocation policy so that less secure processes can resume making use of the cache resource and hence can be provided with improved performance.

In the case where the shared resource comprises a cache, another way of providing the secure-biased allocation policy with a stronger bias towards allocation to secure software processes may be that information allocated into the cache may be protected against eviction for a certain minimum period, and for secure software processes this protected period may be longer in time than for a less secure software process. Hence, on average over time it is more likely that a greater share of cache resource may be allocated to the secure domain than for the less secure domain. As in a denial of service attack part of the risk is caused by the fact that if there is excessive demand from the less secure software processes this may continually evict information allocated into the cache by a secure software process before a subsequent cache access from the secure software processes can read the previously allocated data, then simply protecting secure information in the cache from being evicted for a longer period may be enough to deal with the risk of the denial of service attack, even is it is still allowed for less secure processes to be allocated cache resource.

In some examples of the secure-biased allocation policy, the bias towards the secure software processes could be a bias in the "spatial dimension", in the sense that the allocation policy constrains which resource items can be acquired by the less secure process (or constrains whether the less secure process is allowed to acquire additional resource). The examples above of reserving resource for the secure domain, or preventing the less secure domain acquiring resource previously allocated to the secure domain, are examples of this "spatial" control over resource allocation. For instance, an algorithm could be used for cache allocation where cache allocation requests triggered by the secure domain may replace previously cached data associated with either the secure or less secure domain, but cache allocation requests triggered by a less secure software process processed in the less secure domain may only replace less secure cache lines and may not evict secure cache lines.

However, in other examples of the secure-biased allocation policy, the bias of resource allocation towards the secure software processes can be in the "temporal dimension", so that although in general the less secure software processes may be allowed to acquire any piece of resource, even if previously allocated to a secure software process, the acquisition of resource previously allocated to the secure domain by a less secure software process may be permitted less frequently than acquisition of resource previously allocated to the less secure domain by the secure domain. For example, in a cache or buffer, the secure-biased allocation policy may allow replacing a secure data entry with less secure data for less secure software at a slower speed than replacing a less secure data entry with secure data for secure software. Over time, this will tend to result in the secure software processes having a greater share of resource than the less secure software processes.

As discussed in examples above, the shared resource may be one of: cache storage capacity, storage capacity in a buffer, and bandwidth on a bus.

FIG. 1 schematically illustrates an example of data processing apparatus 2. The apparatus 2 has a number of processing elements 4, which could for example be a CPU (Central Processing Unit), GPU (Graphics Processing Unit) or other type of processing device which is able to execute instructions to perform data processing operations. Each processing element has a processing pipeline 6 for fetching program instructions to be executed from an instruction cache 8 or main memory, and executing the instructions to perform data processing operations. Operands for the instructions may be read from registers 10 and results from the executed operations are written back to the registers 10. The processing pipeline has access to data in a data cache 12. A processing element could also have further levels of cache such as a shared level two cache 14 shared between instructions and data. Access to the memory system including the caches 8, 12, 14 and downstream main memory is controlled by access control circuitry 16 which includes a memory attribute unit 18, such as a Memory Management Unit (MMU) or a Memory Protection Unit (MPU), which is responsible for controlling whether a software process executed at a given privilege level is allowed to access a certain region of the memory address space. In the case of an MMU, the MMU may also handle translation of virtual addresses used by the instructions processed by the pipeline 6 into physical addresses used in the memory system. For an MPU, instructions may specify physical addresses directly and so no address translation is needed. The access control circuitry 16 may also include a security attribute unit 20 which stores data defining regions of the physical address space as secure or less secure, which can be used to provide domain-based protections as discussed in more detail below with respect to FIG. 2.

It will be appreciated that the representations of the processing element 4 shown in FIG. 1 are just one example and are simplified, and each processing element may include many other components not shown in FIG. 1. Also, while the example of FIG. 1 shows both processing elements having similar components, it is possible to provide one processing element with a different hardware configuration compared to another processing element.

The processing elements 4 communicate with each other via a bus 24, which may for example be a coherent interconnect or a non-coherent interconnect. For a coherent interconnect, in addition to routing communications between the processing elements, the bus may also manage coherency between cached data in the respective processing elements 4, to ensure that when one processing element requests access to data from a given address then that processing element is provided with the most up to date value, taking into account updates to the same address triggered by other processing elements. Any coherency scheme may be used by the coherent interconnect. Alternatively, a non-coherent interconnect could be used, and in this case the processing elements themselves may have to perform operations for managing coherency. The bus 24 may include at least one request buffer 26 for buffering requests for access to memory while they are awaiting processing, and may include a shared cache 28 which is shared between the processing elements but can provide faster access to data than if the data had to be fetched from downstream memory.

The bus controls access to slave devices which can be accessed in response to memory access requests issued by the processing elements. For example one or more memory devices 30 may be provided on-chip, and access to these devices may be controlled by a corresponding memory controller 32. The memory controller may include at least one form of buffer 34 for buffering up requests for access to the memory 30 and/or buffering responses to memory access requests. Also an input/output controller 36 may be provided for controlling access to external devices with which the apparatus can communicate via an input/output (I/O) channel. The I/O controller 36 may control access to secondary storage devices located off chip. Again the I/O controller may have one or more buffers 38 for buffering requests and/or responses.

Hence, the processing system 2 shown in FIG. 1 has a number of resources available for access by software processes executed on a given processing element 4. These resources may include the caches 8, 12, 14, 28, space in internal buffers, such as the buffers 26, 34, 38 within the memory system, as well as possible buffers used within a processing element itself that are not shown in FIG. 1 for conciseness. Another form of resource that can be allocated to requests from software processes may be bus bandwidth on the bus 24 or on other communication paths. There may be a number of competing sources of requests for allocation of resource, and so resource allocation control circuitry 40 may be provided, associated with a particular form of resource, for controlling which software processes may gain access to the resource. For conciseness in FIG. 1 the resource control circuitry 40 is shown only for controlling access to the data cache 12 and within the bus 24 for controlling allocation of bus bandwidth, but it will be appreciated that the other forms of resource discussed above may also have corresponding control circuitry which controls allocation of resource. Different types of resource may have different allocation policies associated with them for controlling the allocation of resource.

Figures 2, 3:
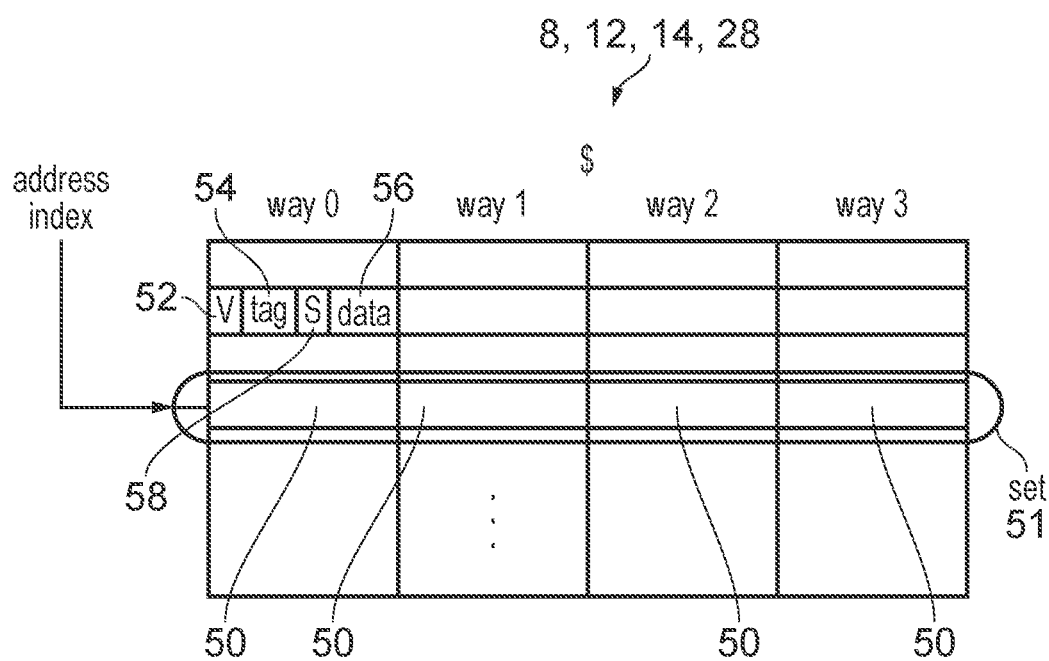
FIG. 2 shows different domains and modes of operation of processing circuitry.
FIG. 3 shows an example of a cache.

As shown in FIG. 2, a processing element 4 may support a number of domains of operation and a number of modes in which it can operate. In this example, the domains include a secure domain (S) and a less secure domain (LS), and the modes include a thread mode (T) and a handler mode (H). Hence, there are four combinations of domains and modes, namely a less secure thread mode, a secure thread mode, a less secure handler mode and a secure handler mode.

The domains provide functionality where software executing in the secure domain can be protected against having its code or data accessed by less secure processes operating in the less secure domain. The security attribute unit 20 within the access control circuitry 16 may define particular regions of the memory address space as being associated with the secure domain S, and any addresses within secure regions may be prevented from being accessed by code executing in the less secure domain. Also, fetching of instructions from secure regions may be prevented when the current domain is the less secure domain. Cached data and transactions passing on the bus and other memory channels may be marked as secure or less secure to ensure that the secure status of certain accesses is observed. Transitions between the less secure domain and the secure domain may be controlled in different ways. In some examples, a dedicated monitor mode of execution may be provided, and transitions between the domains may be controlled by special monitor code executed in the monitor mode. The monitor code, for example, may perform any security checks required to determine whether it is safe to enter the secure domain. In other examples, transitions between the less secure domain and the secure domain may be performed in hardware, with processing automatically transitioned to the secure domain when there is a branch to an instruction address that is within one of the secure memory regions indicated by the security attribute unit 20, provided that certain security checks have been passed (such as that the instruction at the entry point into the secure domain is a particular type of instruction used to mark a valid entry point). With this approach, it is possible to transition directly between the domains using branch instructions without needing to execute intervening monitor code, which can be better for the performance. For example, the TrustZone® architecture provided by Arm® Limited of Cambridge, UK can be used to provide the infrastructure for implementing the partitioning between the secure domain and less secure domain. It will be appreciated that other techniques could also be used to provide a partition between secure and less secure domains.

Within both the less secure domain and the secure domain, it is possible for the processing element to operate in either the thread mode or the handler mode. The handler mode is used for exception processing while the thread mode is used for background processing. Separation of thread and handler modes can be useful to simplify management of which architectural state is accessible to the processing circuitry, which can simplify exception processing and ensure that certain state required for exception handling is not made available to background processing in the thread mode for example. Hence control over access to regions of memory and of which architectural registers are accessible to the processing circuitry may be based on a combination of the current security domain (secure or less secure) and the current mode (thread or handler). In some cases this access control could also be based on other control parameters defined in the instruction set architecture used by the processor.

The shared resources, such as the caches 8, 12, 14, 28, buffers 26, 34, 38 and bus bandwidth on the bus 24 may be shared for access by both secure software processes executed in the secure domain and less secure software processes executed in the less secure domain. This recognises that it can be inefficient from a hardware utilisation point of view to provide dedicated resource for the secure domain only, because often the secure software processes may not need all that resource and in such scenarios it may be preferable to allow the resource provided in hardware to be used by the less secure code in the less secure domain.

However, when resource is shared between secure and less secure processes, then there could potentially be a risk of a denial of service attack where a malicious attacker installs less secure code executed in the less secure domain which generates such a volume of requests for resource (such as memory accesses) that the secure code executing in the secure domain is starved of access to the shared resources to such an extent that the secure code is not able to function correctly.

For example, FIG. 3 shows an example of a cache having a number of cache entries, which could be any of the caches 8, 12, 14, 28 shown in FIG. 1 or any other form of cache (such as a translation look aside buffer for example). In this example, the cache is a set-associative cache, having four ways in this particular example, which means that when information (data or instructions or other control states such as address translation data) is to be allocated into the cache, then that information can only be allocated into one of a restricted set 51 of entries 50, in this example the set 51 comprises four entries. The set of entries to which data having a given address can be allocated is determined by an index value which is determined as a function of the address.

Hence, if the secure code in the secure domain allocates some data to the cache which is critical for it to function correctly, and for which the functioning of the secure code would suffer if that data was evicted since the latency of accessing the data from main memory may be too great, then one way for an attacker to mount an attack on that secure code may be to generate such a volume of cache allocations to addresses sharing the same index value as the critical piece of secure information, so that following one allocation of the secure information into the cache by the secure code, by the time that information is required again by the secure code then the secure information may already have been evicted from the cache because there have been so many allocations made by less secure code.

One approach for dealing with this problem could be to have different allocation policies for the secure and less secure domains respectively so that the policy is more favourable towards allocations triggered by secure code. For example, as shown in FIG. 3, each entry 50 may store, in addition to a valid bit 52 indicating whether the stored information is valid, a tag value 54 indicating a portion of the address corresponding to the stored information which enables the information associated with different addresses showing the same index to be distinguished, and the secure information 56 itself, a security indicator 58 which indicates whether the cached information is associated with the secure domain or the less secure domain. In this case, when a new allocation into the cache needs to be made, different replacement algorithms can be provided for the secure domain and the less secure domain respectively, so that for example an algorithm for non secure domain may only replace cache lines 50 which are indicated as being associated with the less secure domain, while the algorithm for the secure domain could replace both secure or less secure lines when there is a conflict on allocation. However, a problem with this approach is that this may reduce the performance achieved for less secure code, which may be undesirable in cases where there is no attack being mounted.

A similar problem exists for the other types of shared resource such as the buffers or the bus bandwidth, where using separate allocation policies for secure and less secure access requests all the time may unnecessarily limit performance.

With the techniques discussed in this application, these problems can be improved because while generally a shared allocation policy may be used to allocate the shared resource to the less secure and secure processes, when an anomaly condition is detected which indicates there could be a risk of attack or other abnormal behaviour is detected, then the allocation policy may be switched to a secure-biased allocation policy, which provides a stronger bias towards allocation to the secure code than in the shared allocation policy. With this approach the more biased allocation policy is used when the anomaly condition is detected which indicates there is a risk of attack, whereas when that anomaly condition is not being detected then the shared allocation policy is used which can tend to improve performance.

Figure 4:
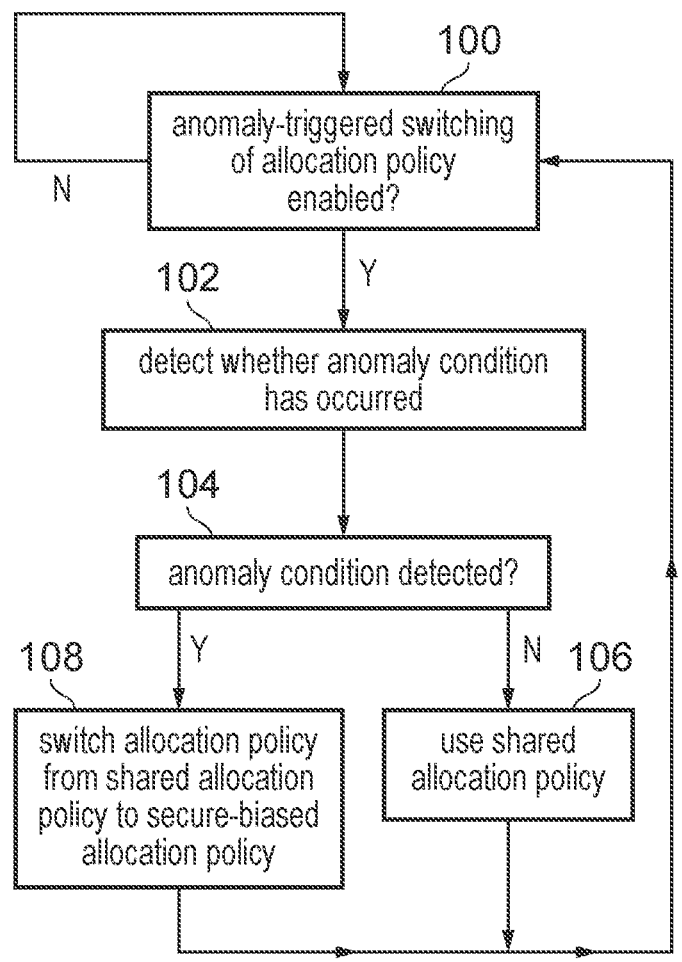
FIG. 4 is a flow diagram showing a method of switching allocation policy in response to detection of an anomaly condition.

FIG. 4 is a flow diagram showing how the switching of allocation policy can be controlled by the resource allocation controller 40. At step 100 the resource allocation controller determines whether anomaly-triggered switching of allocation policy is currently enabled and if not then the method proceeds without changing the allocation policy used. In this case the shared allocation policy may be used regardless of any detection of anomaly conditions.

When anomaly-triggered switching of allocation policy is enabled then at step 102 the resource allocation control circuitry 40 may detect whether the anomaly condition has occurred. There may be a number of ways of detecting the anomaly condition, but in general the detection may be based on a performance metric which depends on the level of demand for the shared resource from code executed in the less secure domain. For example the resource allocation control circuitry 40 could track a metric indicative of a cache miss rate (frequency of requests for which the required data is not stored in the cache) or cache replacement rate, which tracks the frequency with which it is necessary to replace cached information associated with one address with information associated with a different address. A similar request rate metric could be monitored for the buffer and bus resources which may track level of demand. Also, it is possible for the performance metric to track the latency associated with handling requests, for example tracking an average latency or the number of requests whose latency exceeds the certain threshold. It will be appreciated that there are a variety of types of metric which could be used to detect whether there is some anomalous behaviour indicating that the demand for resource from less secure code is unusually high. In general, if the performance metric exceeds some threshold defining when the anomaly condition is to be detected, then the anomaly condition is signalled. Hence, at step 104 it is determined whether the anomaly condition has been detected, and if not then at step 106 the shared allocation policy continues to be used and the method returns to step 100. When the anomaly condition is detected at step 104, then the method proceeds to step 108 where the resource allocation control circuitry switches the allocation policy from the shared allocation policy to the secure-biased allocation policy. This will tend to improve security by increasing the difficulty for a denial of service attack to succeed against secure code.

The secure-biased allocation policy could differ from the shared allocation policy in various ways. For example, the secure-biased allocation policy could reserve a greater fraction of the shared resource for secure processes than in the shared allocation policy. In another example, reallocation of resource previously allocated to a secure process so that it subsequently is allocated to a less secure process may be prohibited in the secure-biased allocation policy, but may be allowed in the shared allocation policy, so that once the secure-biased allocation policy has been selected it is not possible for the fraction of resource used by less secure code to increase, which can make denial of service attacks more difficult. In yet another example, an eviction-protected period may be imposed on secure data allocated to a cache when using the secure-biased allocation policy, where following allocation of secure data into the cache that data cannot be evicted until the eviction-protected period has elapsed. The duration of the eviction-protected period could be measured in different ways, e.g. in terms of absolute time, number of elapsed processing cycles, number of cache accesses, or number of cache allocations/evictions. In the secure-biased allocation policy, the period for which the secure data is protected against eviction may be longer than any eviction-protected period for which the less secure data is protected against eviction (the duration of the eviction-protected period for the less secure data in this case could be zero or non-zero, i.e. it is not essential to provide any eviction-protected period at all for the less secure data). Hence, there are a number of ways in which the allocation policy may favour the secure code over the less secure code to a greater extent in the secure-biased allocation policy than in the shared allocation policy.

In some implementations it may not be desirable to always enable the anomaly-triggered switching of allocation policy shown in FIG. 4. For example, in some cases the dynamic throttling of allocation policy could be done specifically for certain scenarios relating to combinations of the security domain and the operation mode, or following certain transitions between the different modes and domains. Hence, when transitions occur which indicate that there is a specific risk of attack and the anomaly condition is detected because there has been a sign of increased cache thrashing then the allocation policy may change to the secure-biased allocation policy, whereas if the mode/domain transition that indicated the risk has not arisen then even if there was a cache thrashing effect detected then it may not be necessary to switch the allocation policy, since code executed in certain combinations of modes and domains may not be considered to cause significant consequences if they could not function correctly. For example, it may be considered most important to protect code executing in the secure handler mode against the risk of denial of service attacks whereas code executing in the other combinations of domain and mode may not be as critical, and so to improve performance it may be preferred to use the shared allocation policy to handle allocations of information associated with these other operating states. Hence, in some cases the anomaly-triggered switching of allocation policy could be enabled only when a certain transition, such as a transition out of the secure handler mode, is detected (it being recognised that once a transition out of the secure handler mode has been detected, then it may be desirable to preserve any cached information which has already been allocated into the cache by the secure handler mode and prevent it from being evicted by the less secure handler mode or thread mode). In other scenarios other transitions may be used as a signal to enable the anomaly-triggered switching of allocation policy.

Figure 5:
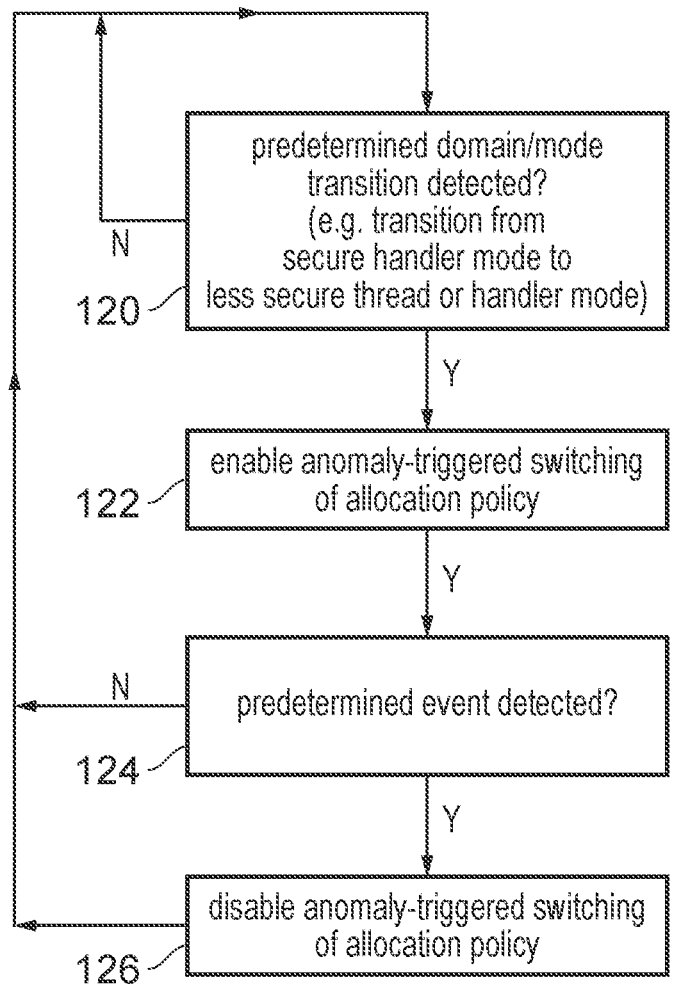
FIG. 5 is a flow diagram showing a method of controlling whether anomaly-triggered switching of allocation policy is enabled or disabled.

Hence, as shown in FIG. 5, the resource allocation control circuitry may perform a method to control whether the switching of allocation policy is enabled or disabled. At step 120 the resource controller 40 determines whether a predetermined domain/mode transition has been detected, such as a transition from the secure handler mode to the combination of less secure domain and either the thread or handler mode. If the predetermined domain/mode transition is detected then at step 122 anomaly-triggered switching of allocation policy is enabled. This means that if a DoS attack is mounted, and the anomaly is detected, the switch of allocation policy will tend to preserve the resource previously allocated for the secure handler mode, so that on return to the secure handler mode at a later time its performance is not significantly impacted by the attack when the execution returns to the same handler upon the next transition.

Subsequently, if a predetermined event indicative that anomaly-triggered switching of allocation policy is no longer required is detected at step 124, then at step 126 the anomaly-triggered switching of allocation policy is disabled again, which will ensure that the shared allocation policy is used. For example, the predetermined event could be a transition to a combination of domain/mode which indicates there is less chance to execute in a pre-empted secure domain upon the next domain/mode transition. Also the predetermined event could be the elapse of a predetermined period (e.g. a certain number of processing cycles, or the counting of a certain number of resource allocations), since the previous transition from the secure handler mode, which might mean it is less likely that the secure handler mode still has a significant amount of resource allocated to it, so that it may be considered appropriate to disable anomaly-triggered switching again. It will be appreciated that the specific events shown at steps 120 and 124 for enabling and disabling the anomaly-triggered switching of allocation policy are just one example and other events could also be used.

In once particular example, the control of allocation policy may be performed as follows:

The shared allocation policy is used until the apparatus detects a transition from a secure handler mode into a less-secure thread mode.

Once the designated transition is detected, the apparatus turns on allocation rate detection to detect abnormal allocation that might be an indication of a denial of service attack on the cache.

Once the rate (could be access-based or system-timing-based) is higher than a threshold, the apparatus changes the replacement algorithm to favour secure cache lines (e.g. by not replacing them with less-secure cache lines).

Once the rate comes back to another lower threshold, the apparatus switches the replacement algorithm back to the shared allocation policy, to fairly share the cache resource between secure and less-secure domains, which is better for performance.

When encountering another transition of security domain and/or operation mode, the apparatus could enable different rate control (e.g. a different threshold for anomaly detection), or simply turn off the detection of whether the anomaly condition has occurred.

It will be appreciated that this is just one example and there are other ways of implementing the variable allocation policy based on anomaly detection.

Hence, in summary, the techniques discussed above dynamically determine resource allocation or replacement, e.g. cache replacement, based on the detection of anomalies such as the resource taken rate by less secure domain activities and based on the impact on the prospective serviceability of secure world operations. This can increase difficulty for denial of service attacks to be mounted while increasing the amount of resource sharing between the secure domain and the less secure domain which can help to improve performance.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
 processing circuitry having a plurality of domains of operation including a secure domain and a less secure domain;
 access control circuitry to prevent secure information associated with a secure software process processed in the secure domain from being accessed by a less secure software process processed in the less secure domain;
 shared resource accessible to both secure software processes processed in the secure domain and less secure software processes processed in the less secure domain; and
 resource allocation control circuitry to control allocation of the shared resource according to an allocation policy by:
  detecting an anomaly condition based at least on a level of demand for the shared resources from the less secure software processes; and
  in response to detection of the anomaly condition, switching the allocation policy from a shared allocation policy to a secure-biased allocation policy, and
 wherein, compared to the shared allocation policy, the secure-biased allocation policy has a stronger bias of resource allocation to secure software processes in preference to resource allocation to less secure software processes.

2. The apparatus according to claim 1, in which the anomaly condition comprises a condition indicative of starvation of shared resource for the secure software processes due to demand for shared resource by the less secure software processes.

3. The apparatus according to claim 1, in which the shared resource comprises a cache; and
the anomaly condition is dependent on a cache replacement rate exceeding a threshold, where the cache replacement rate is indicative of a frequency with which information stored in the cache is evicted to make way for other information.

4. The apparatus according to claim 1, in which the anomaly condition is dependent on a latency metric exceeding a threshold, where the latency metric is indicative of latency of servicing requests for access to the shared resource.

5. The apparatus according to claim 1, in which when anomaly-triggered switching of allocation policy is enabled, the resource allocation control circuitry is configured to switch the allocation policy from the shared allocation policy to the secure-biased allocation policy in response to detection of the anomaly condition; and
when anomaly-triggered switching of allocation policy is disabled, the resource allocation control circuitry is configured to use the shared allocation policy regardless of whether the anomaly condition occurs.

6. The apparatus according to claim 5, in which the resource allocation control circuitry is configured to enable the anomaly-triggered switching of allocation policy in response to a predetermined transition of domain and/or operating mode of the processing circuitry.

7. The apparatus according to claim 6, in which the predetermined transition comprises a transition from the secure domain to the less secure domain.

8. The apparatus according to claim 6, in which within a given domain, the processing circuitry is configured to perform data processing in one of a plurality of operating modes; and
the predetermined transition comprises a transition from a first mode/domain combination to a second mode/domain combination.

9. The apparatus according to claim 8, in which the plurality of operating modes comprise a handler mode for exception processing and a thread mode for background processing;
the first mode/domain combination comprises processing in the secure domain and the handler mode; and
the second mode/domain combination comprises processing in the less secure domain and one of the handler mode and the thread mode.

10. The apparatus according to claim 6, in which in response to another transition of the domain and/or operating mode of the processing circuitry, or elapse of a predetermined period since the predetermined transition of domain and/or operating mode, the resource allocation control circuitry is configured to disable the anomaly-triggered switching of allocation policy.

11. The apparatus according to claim 1, in which the resource allocation control circuitry is configured to detect the anomaly condition based on a comparison between an anomaly metric and a threshold; and
the threshold is variable depending on at least one of:
a current domain or current operating mode of the processing circuitry; and
a history of previous transitions of domain and/or operating mode of the processing circuitry.

12. The apparatus according to claim 1, in which in response to detection that the anomaly condition no longer arises, the resource allocation control circuitry is configured to switch the allocation policy from the secure-biased allocation policy to the shared allocation policy.

13. The apparatus according to claim 1, in which, in the shared allocation policy, control of allocation of resource is independent of whether resource is requested by a secure software process or a less secure software process.

14. The apparatus according to claim 1, in which, in the secure-biased allocation policy, the resource allocation control circuitry is configured to reserve a portion of the shared resource for secure software processes, or restrict a maximum fraction of the shared resource that is allowed to be allocated to less secure software processes.

15. The apparatus according to claim 1, in which in the secure-biased allocation policy, the resource allocation control circuitry is configured to prevent resource being reallocated from a secure software process to a less secure software process.

16. The apparatus according to claim 1, in which the shared resource comprises a cache, and in the secure-biased allocation policy, the resource allocation control circuitry is configured to prevent information being allocated to the cache in response to a request issued by a less secure software process processed in the less secure domain.

17. The apparatus according to claim 1, in which the shared resource comprises a cache, and in the secure-biased allocation policy, information allocated to the cache by a secure software process is protected against eviction for a longer period than information allocated to the cache by a less secure software process.

18. The apparatus according to claim 1, in which the shared resource comprises one of:
cache storage capacity;
storage capacity in a buffer; and
bandwidth on a bus.

19. An apparatus comprising:
means for processing, having a plurality of domains of operation including a secure domain and a less secure domain;
means for preventing secure information associated with a secure software process processed in the secure domain from being accessed by a less secure software process processed in the less secure domain;
means for providing shared resource, accessible to both secure software processes processed in the secure domain and less secure software processes processed in the less secure domain; and
means for controlling allocation of the shared resource according to an allocation policy by:
detecting an anomaly condition based at least on a level of demand for the shared resources from the less secure software processes; and
in response to detection of the anomaly condition, switching the allocation policy from a shared allocation policy to a secure-biased allocation policy; and
wherein, compared to the shared allocation policy, the secure-biased allocation policy has a stronger bias of resource allocation to secure software processes in preference to resource allocation to less secure software processes.

20. A data processing method for an apparatus comprising processing circuitry having a plurality of domains of operation including a secure domain and a less secure domain, where secure information associated with a secure software process processed in the secure domain is prevented from being accessed by a less secure software process processed in the less secure domain; the method comprising:
performing processing using shared resource, where the shared resource is accessible to both secure software processes processed in the secure domain and less secure software processes processed in the less secure domain;

controlling allocation of the shared resource according to an allocation policy by:
    detecting an anomaly condition based at least on a level of demand for the shared resources from the less secure software processes;
    in response to detection of the anomaly condition, switching the allocation policy from a shared allocation policy to a secure-biased allocation policy; and wherein, compared to the shared allocation policy, the secure-biased allocation policy has a stronger bias of resource allocation to secure software processes in preference to resource allocation to less secure software processes.

\* \* \* \* \*